United States Patent
Chen et al.

(10) Patent No.: US 12,326,509 B2
(45) Date of Patent: Jun. 10, 2025

(54) SYSTEM AND METHOD FOR DIAGNOSING SENSOR PERFORMANCE OF AN ULTRA WIDE BAND SENSOR LOCALIZATION

(71) Applicant: GM Global Technology Operations LLC, Detroit, MI (US)

(72) Inventors: Jinzhu Chen, Troy, MI (US); Zijun Han, Rochester Hills, MI (US); Fan Bai, Ann Arbor, MI (US); Aaron Adler, Rochester Hills, MI (US); John Sergakis, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 435 days.

(21) Appl. No.: 18/049,911

(22) Filed: Oct. 26, 2022

(65) Prior Publication Data
US 2024/0151805 A1    May 9, 2024

(51) Int. Cl.
*G01S 5/02* (2010.01)
*G01S 5/10* (2006.01)
*H04B 1/7163* (2011.01)

(52) U.S. Cl.
CPC ............... *G01S 5/021* (2013.01); *G01S 5/10* (2013.01); *H04B 1/7163* (2013.01)

(58) Field of Classification Search
CPC ... G01S 5/021; G01S 5/10; G01S 5/14; G01S 13/876; H04B 1/7163
See application file for complete search history.

(56) References Cited

U.S. PATENT DOCUMENTS

| | | | |
|---|---|---|---|
| 2017/0361726 A1* | 12/2017 | Widmer | G01S 19/45 |
| 2021/0055370 A1* | 2/2021 | Tolentino | G01S 5/14 |
| 2022/0179035 A1* | 6/2022 | Zhang | G01S 5/02213 |

* cited by examiner

*Primary Examiner* — Ricky Go
(74) *Attorney, Agent, or Firm* — Vivacqua Crane, PLLC

(57) ABSTRACT

Systems and methods of diagnosing sensor performance of an ultra wide band (UWB) sensor localization for a vehicle are provided. The method comprises receiving sensor signals from at least four UWB anchors and a UWB tag for a time period. The sensor signals represent anchor coordinates and real-time distances between the tag and each anchor. The method comprises aligning the sensor signals to define aligned data. The method comprises calculating a predicted location of the UWB tag based on the aligned data and a least square of error to define a first constructed matrix and a second constructed matrix. The method comprises determining a local error of each of the at least four UWB anchors based on the least square of error and comparing each local error with an error threshold to define a first threshold high. The method comprises determining an erratic anchor based on the first threshold high.

18 Claims, 2 Drawing Sheets

SYSTEM AND METHOD FOR DIAGNOSING SENSOR PERFORMANCE OF AN ULTRA WIDE BAND SENSOR LOCALIZATION

INTRODUCTION

The present disclosure relates to systems and methods of diagnosing wireless localization of targets and, more particularly, systems and methods of diagnosing sensor performance of an ultra wide band (UWB) sensor localization for a vehicle.

Wireless localization of mobile targets can be achieved for outdoor environments. However, accuracies may vary for a number of wireless technologies or networks such as Wi-Fi or Bluetooth Low Energy. More specifically, there are inaccuracy issues due to sensor error or failure. Moreover, diagnostic protocols and architectures may not be time efficient and cost effective.

SUMMARY

Thus, while current wireless systems and methods achieve their intended purpose, there is a need for a new and improved system and method of diagnosing sensor performance of an ultra wide band (UWB) sensor localization for a vehicle In accordance with one aspect of the present disclosure, a method of diagnosing sensor performance of an ultra wide band (UWB) sensor localization for a vehicle is provided. The method comprises receiving sensor signals from at least four UWB anchors and a UWB tag for a time period. The sensor signals represent anchor coordinates and real-time distances between the tag and each anchor. The method further comprises aligning the sensor signals at an aligned timestamp during the time period by way of:

$$\overline{t_{s_i} + \frac{k}{f_i}} = t_i \text{ when } t_{i-1} \le t_{s_i} + \frac{k}{f_i} < t_i$$

where $t_{s_i}$ is an initial timestamp of the time period, k is a number of timestamps of the time period, $f_i$ is a fixed data uploading frequency, $t_i$ is the aligned timestamp, and $t_{s_i}+klf_i$ is at an upper limit thereof to define aligned data.

In this aspect, the method further comprises calculating a predicted location of the UWB tag based on the aligned data and a least square of error by way of:

$$X = (A^T A)^{-1}(A^T B)$$

where $$X = \begin{bmatrix} x \\ y \end{bmatrix}$$

is the predicted location, A is a first constructed matrix, and B is a second constructed matrix based on the anchor coordinates and the real-time distances. Moreover, the method further comprises determining an error matrix of the at least four UWB anchors based on the least square of error by way of:

$$\varepsilon = AX - B$$

where $\varepsilon$ is the error matrix.

The method further comprises comparing each local error in the error matrix with an error threshold to define a first threshold high and determining an erratic anchor based on the first threshold high.

In one example, the step of calculating the predicted location of the UWB tag comprises calculating a geometric circle of each of the at least four UWB anchors relative to the aligned data by way of:

$$\begin{cases} (x-x_1)^2 + (y-y_1)^2 = d_1^2 \\ (x-x_2)^2 + (y-y_2)^2 = d_2^2 \\ \quad \cdots \\ (x-x_n)^2 + (y-y_n)^2 = d_n^2 \end{cases}$$

where x and y are the predicted coordinates of the UWB tag, n is the total number of signals from the UWB anchors during the time period, $x_n$ and $y_n$ are anchor coordinates of the respective UWB anchor, $d_n$ is a real-time distance between the UWB tag and the respective UWB anchor to define adjacent circles of the at least four UWB anchors. In this example, calculating the predicted location of the UWB tag further comprises subtracting between adjacent circles by way of:

$$\begin{cases} 2(x_2-x_1)x + 2(y_2-y_1)y = d_1^2 - d_2^2 - (x_1^2+y_1^2) + (x_2^2+y_2^2) \\ 2(x_3-x_2)x + 2(y_3-y_2)y = d_2^2 - d_3^2 - (x_2^2+y_2^2) + (x_3^2+y_3^2) \\ \quad \cdots \\ 2(x_n-x_{n-1})x + 2(y_n-y_{n-1})y = d_{n-1}^2 - d_n^2 - (x_{n-1}^2+y_{n-1}^2) + (x_n^2+y_n^2) \end{cases}$$

to define the first and second matrices as:

$$A = \begin{bmatrix} 2(x_2-x_1) & 2(y_2-y_1) \\ 2(x_3-x_2) & 2(y_3-y_2) \\ \cdots & \cdots \\ 2(x_n-x_{n-1}) & 2(x_n-x_{n-1}) \end{bmatrix} \text{ and }$$

$$B = \begin{bmatrix} d_1^2 - d_2^2 - (x_1^2+y_1^2) + (x_2^2+y_2^2) \\ d_2^2 - d_3^2 - (x_2^2+y_2^2) + (x_3^2+y_3^2) \\ \cdots \\ d_{n-1}^2 - d_n^2 - (x_{n-1}^2+y_{n-1}^2) + (x_n^2+y_n^2) \end{bmatrix}$$

In this example, calculating the predicted location of the UWB tag further comprises analyzing F(X)=E when a deviation of E to X is zero to minimize E by way of:

$$\frac{dF(X)}{dX} = 2A^T AX - 2A^T B = 0,$$

where $E = |\Sigma|^2 = (AX-B)^T(AX-B)$.

In another example, determining the local error of each of the at least four UWB anchors comprises mapping each local error to each UWB anchor. In yet another example, the first threshold high is a highest count of local errors greater than the error threshold.

In still another example, the method further comprises calculating a predicted location of the UWB tag for at least four groups of at least three anchors based on the aligned data and the least square of error by way of:

$$X = (A^T A)^{-1}(A^T B),$$

to define a grouped predicted location for each anchor of the at least four groups. The method further comprises determining an error matrix for anchors of the at least four groups based on the least square of error by way of:

$$\varepsilon = AX - B,$$

to define a grouped error matrix for the at least four groups.

In this example, the method further comprises comparing each local error of each anchor in the grouped error matrix with the error threshold defining a grouped threshold high of the at least four groups. The grouped threshold high is a highest count of local errors greater than the error threshold. Moreover, the method comprises comparing the grouped threshold high with the first threshold high. The first threshold high being based on an error average of the local errors of the at least four anchors. Furthermore, the step of determining the erratic sensor is based on a higher count between the grouped threshold high and the first threshold high.

In accordance with another aspect of the present disclosure, a system for diagnosing sensor performance of an ultra wide band (UWB) sensor localization for a vehicle is provided. The system comprises a UWB tag arranged to be mobile and trackable by way of a sensor signal. The system further comprises at least four UWB anchors. Each UWB anchor is in communication with the UWB tag and arranged to receive and send the sensor signal for tracking the UWB tag.

In this embodiment, the system further comprises a gateway in communication with the UWB anchor. The gateway comprises an electronic control unit (ECU) arranged to receive sensor signals from at the UWB anchors for a time period. The sensor signals represent anchor coordinates and real-time distances between the tag and each anchor.

Moreover, the ECU comprises a preprocessing module arranged to align the sensor signals at an aligned timestamp during the time period by way of:

$$\overline{t_{s_i} + \frac{k}{f_i}} = t_i \text{ when } t_{i-1} \le t_{s_i} + \frac{k}{f_i} < t_i$$

where $t_{s_i}$ is an initial timestamp of the time period, k is a number of timestamps of the time period, $f_i$ is a fixed data uploading frequency, $t_i$ is the aligned timestamp, and $t_{s_i} + klf_i$ is at an upper limit thereof to define aligned data.

Additionally, the ECU comprises a least square module arranged to calculate a predicted location of the UWB tag based on the aligned data and a least square of error by way of:

$$X = (A^T A)^{-1} (A^T B),$$

where $$X = \begin{bmatrix} x \\ y \end{bmatrix}$$

is the predicted location, A is a first constructed matrix, and B is a second constructed matrix based on the anchor coordinates and the real-time distances. The least square module is further arranged to determine an error matrix of the at least four UWB anchors based on the least square of error by way of:

$$\varepsilon = AX - B,$$

where $\varepsilon$ is the error matrix.

Furthermore, in this embodiment, the ECU is arranged to compare each local error with an error threshold to define a first threshold high and determine an erratic anchor based on the first threshold high.

In one embodiment, the least square module being arranged to calculate the predicted location of the UWB tag comprises the least square module arranged to calculate a geometric circle of each of the at least four UWB anchors relative to the aligned data by way of:

$$\begin{cases} (x - x_1)^2 + (y - y_1)^2 = d_1^2 \\ (x - x_2)^2 + (y - y_2)^2 = d_2^2 \\ \quad \cdots \\ (x - x_n)^2 + (y - y_n)^2 = d_n^2 \end{cases}$$

where x and y are the predicted coordinates of the UWB tag, n is the total number of signals from the UWB anchors during the time period, $x_n$ and $y_n$ are anchor coordinates of the respective UWB anchor, $d_n$ is a real-time distance between the UWB tag and the respective UWB anchor to define adjacent circles of the at least four UWB anchors.

In this embodiment, the least square module being arranged to calculate the predicted location of the UWB tag comprises the least square module being arranged to subtract between the adjacent circles by way of:

$$\begin{cases} 2(x_2 - x_1)x + 2(y_2 - y_1)y = d_1^2 - d_2^2 - (x_1^2 + y_1^2) + (x_2^2 + y_2^2) \\ 2(x_3 - x_4)x + 2(y_3 - y_2)y = d_2^2 - d_3^2 - (x_2^2 + y_2^2) + (x_3^2 + y_3^2) \\ \quad \cdots \\ 2(x_n - x_{n-1})x + 2(y_n - y_{n-1})y = d_{n-1}^2 - d_n^2 - (x_{n-1}^2 + y_{n-1}^2) + (x_n^2 + y_n^2) \end{cases}$$

to define the first and second matrices as:

$$A = \begin{bmatrix} 2(x_2 - x_1) & 2(y_2 - y_1) \\ 2(x_3 - x_2) & 2(y_3 - y_2) \\ \cdots & \cdots \\ 2(x_n - x_{n-1}) & 2(x_n - x_{n-1}) \end{bmatrix} \text{ and }$$

$$B = \begin{bmatrix} d_1^2 - d_2^2 - (x_1^2 + y_1^2) + (x_2^2 + y_2^2) \\ d_2^2 - d_3^2 - (x_2^2 + y_2^2) + (x_3^2 + y_3^2) \\ \cdots \\ d_{n-1}^2 - d_n^2 - (x_{n-1}^2 + y_{n-1}^2) + (x_n^2 + y_n^2) \end{bmatrix}.$$

Further to this embodiment, the least square module being arranged to calculate the predicted location of the UWB tag comprises the least squares module arranged to analyze F(X)=E when a deviation of E to X is zero to minimize E by way of:

$$\frac{dF(X)}{dX} = 2A^T AX - 2A^T B = 0,$$

$$E = |\varepsilon|^2 = (AX - B)^T (AX - B).$$

In one embodiment, the ECU being arranged to determine the local error of each of the at least four UWB anchors comprises the ECU arranged to map each local error to each UWB anchor. In another embodiment, the first threshold high is a highest count of local errors greater than the error threshold.

In yet another embodiment, the least square module is further arranged to calculate a predicted location of the UWB tag for at least four groups of at least three anchors based on the aligned data and the least square of error by way of:

$$X = (A^T A)^{-1}(A^T B),$$

to define a grouped predicted location for each anchor of the at least four groups. Moreover, the least square module is arranged to determine an error matrix for anchors of the at least four groups based on the least square of error by way of:

$$\varepsilon = AX - B,$$

to define an error matrix for anchors of the at least four groups.

Additionally, the ECU is further arranged to compare each local error of each anchor in the grouped error matrix with the error threshold defining a grouped threshold high of the at least four groups. The grouped threshold high is a highest count of local errors greater than the error threshold. Further, the ECU is arranged to compare the grouped threshold high with the first threshold high. The first threshold high is based on an error average of the local errors of the at least four anchors. Furthermore, the ECU determines the erratic sensor based on a higher count between the grouped threshold high and the first threshold high.

In accordance with yet another example of the present disclosure, a method of diagnosing sensor performance of an ultra wide band (UWB) sensor localization for a vehicle is provided. The method comprises receiving sensor signals from at least four UWB anchors and a UWB tag for a time period. The sensor signals represent anchor coordinates and real-time distances between the tag and each anchor. The method further comprises aligning the sensor signals at an aligned timestamp during the time period to define aligned data.

In this example, the method further comprises calculating a predicted location of the UWB tag based on the aligned data and a least square of error to define a first constructed matrix and a second constructed matrix based on the anchor coordinates and the real-time distances. Moreover, the method comprises determining a local error of each of the at least four UWB anchors based on the least square of error. The method further comprises comparing each local error with an error threshold to define a first threshold high. Furthermore, the method comprises determining an erratic anchor based on the first threshold high.

In one example, determining the local error of each of the at least four UWB anchors comprises mapping each local error to each UWB anchor.

In another example, the method further comprises calculating a predicted location of the UWB tag for at least four groups of at least three anchors based on the aligned data and the least square of error to define a grouped predicted location for each anchor of the at least four groups. The method further comprises determining an error matrix for anchors of the at least four groups based on the least square of error to define an error matrix for anchors of the at least four groups. Moreover, the method comprises comparing each local error of each anchor in the grouped error matrix with the error threshold defining a grouped threshold high of the at least four groups. The grouped threshold high is a highest count of local errors greater than the error threshold.

Additionally, the method comprises comparing the grouped threshold high with the first threshold high, the first threshold high being based on an error average of the local errors of the at least four anchors. Furthermore, determining the erratic sensor is based on a higher count between the grouped threshold high and the first threshold high.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Embodiments of the present disclosure are systems and methods for diagnosing sensor performance for a UWB sensor localization of a vehicle. The systems and methods described herein improve UWB technology related to diagnosing sensor error during localization of a mobile target, such as a key fob. The systems and methods of the present disclosure minimize or exclude noise data caused by sensor error when determining a real-time location of a UWB tag, thereby improving localization accuracy and reducing computation costs of UWB technology.

Figure 1:
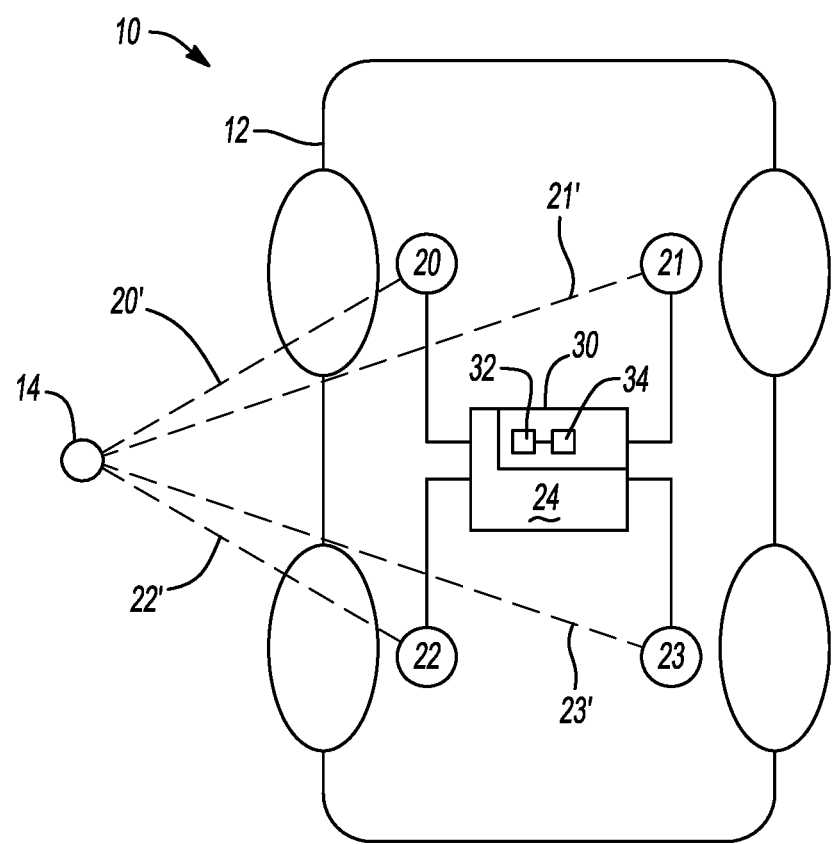
FIG. 1 is a schematic view of a system for diagnosing sensor performance of an ultra wide band (UWB) sensor localization for a vehicle in accordance with one embodiment of the present disclosure.

FIG. 1 illustrates a system 10 for diagnosing sensor performance for a UWB sensor localization of a vehicle in accordance with one embodiment of the present disclosure. It is to be understood that the system 10 uses a short-range wireless communication protocol UWB having a range of frequency from about 3.1 GHz to about 10.5 GHz. Moreover, the system 10 has UWB sensors which may operate in two modes, namely anchor and tag. As shown, the system 10 comprises a mobile UWB tag 14 arranged to be trackable by at least four UWB anchors via a sensor signal, preferably a plurality of sensor signals. In this embodiment, the system 10 has four anchors 20-23 mounted on or fixed to the vehicle 12. Moreover, the UWB tag 14 is a mobile sensor and is moveably remote from the vehicle 12. The UWB tag 14 is arranged to receive and send sensor signals 20'-23' for tracking the UWB tag 14. Moreover, each UWB anchor is in communication with the UWB tag 14, and arranged to receive and send sensor signals 20'-23' for data and tracking of the UWB tag 14.

In this example, each pair of sensors (anchor and tag) communicate by way of a sender-receiver model. Hence, a simple distance measurement strategy may be implemented. In this example, the tag initializes a two-way-ranging (TWR) by sending a poll message signal to the anchor. Next, the anchor records the time of reception and sends a response message signals to the tag. Using a time of flight (ToF) approach, the tag receives the response message and determines the ToF based on an overall time span $T_{loop}$ and a processing time span $T_{reply}$ as follows:

ToF=$(T_{loop}-T_{reply})/2$. In turn, an estimated distance of the tag may be calculated by multiplying ToF to the speed of light by way of:

Estimated distance=ToF×($3\times10^8$ m/s).

As shown in FIG. 1, the system 10 further comprises a gateway 24 in communication with the UWB anchors 20-23 and UWB tag 14. Moreover, the gateway 24 is arranged to be communicable with a cloud server (not shown) as desired. The gateway 24 comprises an electronic control unit (ECU) or processor 30 arranged to receive and send sensor signals 20'-23' to and from the UWB anchors 20-23 and UWB tag 14 for a time period. In this embodiment, the sensor signals 20'-23' comprise or represent anchor coordinates and real-time distances between the tag and each anchor.

It is to be understood that the ECU 30 comprises software and a number of modules arranged to run algorithms to calculate, compute, and determine values to assist in the operation of the system 10 as discussed in greater detail below. In this embodiment, the ECU 30 comprises a pre-processing module 32 arranged to align the sensor signals 20'-23' at an aligned timestamp during the time period by way of:

$$\overline{t_{s_i} + \frac{k}{f_i}} = t_i \text{ when } t_{i-1} \leq t_{s_i} + \frac{k}{f_i} < t_i.$$

As shown, $t_{si}$ is an initial timestamp of the time period, k is a number of timestamps of the time period, $f_i$ is a fixed data uploading frequency, $t_i$ is the aligned timestamp, and $t_{si}+klf_i$ is at an upper limit thereof to define aligned data.

Moreover, the ECU 30 comprises a least square module 34 arranged to calculate a predicted location of the UWB tag based on the aligned data and a least square of error by way of:

$X=(A^T A)^{-1}(A^T B)$.

As shown, $$X = \begin{bmatrix} x \\ y \end{bmatrix}$$

is the predicted location, A is a first constructed matrix, and B is a second constructed matrix based on the anchor coordinates and the real-time distances.

In calculating the predicted location of the UWB tag, the least square module 34 is arranged to calculate a geometric circle of each of the at least four UWB anchors relative to the aligned data by way of:

$$\begin{cases} (x-x_1)^2 + (y-y_1)^2 = d_1^2 \\ (x-x_2)^2 + (y-y_2)^2 = d_2^2 \\ \ldots \\ (x-x_n)^2 + (y-y_n)^2 = d_n^2 \end{cases}.$$

As shown, x and y are tag coordinates of the UWB tag, n is a signal of one of the UWB anchors during the time period, $x_n$ and $y_n$ are anchor coordinates of the respective UWB anchor, and $d_n$ is a real-time distance between the UWB tag and the respective UWB anchor to define adjacent circles of the at least four UWB anchors.

Regarding the calculation of the predicted location, the least square module 34 is arranged to subtract between the adjacent circles by way of:

$$\begin{cases} 2(x_2-x_1)x + 2(y_2-y_1)y = d_1^2 - d_2^2 - (x_1^2+y_1^2) + (x_2^2+y_2^2) \\ 2(x_3-x_2)x + 2(y_3-y_2)y = d_2^2 - d_3^2 - (x_2^2+y_2^2) + (x_3^2+y_3^2) \\ \ldots \\ 2(x_n-x_{n-1})x + 2(y_n-y_{n-1})y = d_{n-1}^2 - d_n^2 - \\ (x_{n-1}^2+y_{n-1}^2) + (x_n^2+y_n^2) \end{cases}$$

to define the first and second matrices as:

$$A = \begin{bmatrix} 2(x_2-x_1) & 2(y_2-y_1) \\ 2(x_3-x_2) & 2(y_3-y_2) \\ \ldots & \ldots \\ 2(x_n-x_{n-1}) & 2(x_n-x_{n-1}) \end{bmatrix} \text{ and }$$

$$B = \begin{bmatrix} d_1^2 - d_2^2 - (x_1^2+y_1^2) + (x_2^2+y_2^2) \\ d_2^2 - d_3^2 - (x_2^2+y_2^2) + (x_3^2+y_3^2) \\ \ldots \\ d_{n-1}^2 - d_n^2 - (x_{n-1}^2+y_{n-1}^2) + (x_n^2+y_n^2) \end{bmatrix}.$$

Further to the calculation of the predicted location, the least squares module is arranged to analyze F(X)=E when a deviation of E to X is zero to minimize E by way of:

$$\frac{dF(X)}{dX} = 2A^T AX - 2A^T B = 0,$$

where E=$|\varepsilon|^2$=$(AX-B)^T(AX-B)$.

In this embodiment, the least square module 34 is further arranged to determine a local error of each of the at least four UWB anchors based on the least square of error by way of:

$\varepsilon = AX - B$ where $\varepsilon$ is the error matrix. In determining the local error in the error matrix, the ECU 30 is arranged to map each local error to each UWB anchor.

Additionally, in this embodiment, the ECU 30 is arranged to compare each local error with an error threshold to define a first threshold high. Preferably, the first threshold high is a highest count of local errors greater than the error threshold.

It is to be understood that the error threshold may be defined by way of any suitable offline data without departing from the spirit or scope of the present disclosure. For example, the error threshold may be defined by results from experimentation of normally functioning UWB anchors and malfunctioning UWB anchors whereby error deviations are found.

Furthermore, the ECU 30 is arranged to determine an erratic anchor based on the first threshold high. Hence, the erratic sensor is identified to be the sensor with the highest count above the error threshold. In turn, a number of protocols may be triggered or put in place as desired. For example, the ECU may be arranged to power off the erratic sensor or ignore data signals therefrom. Additionally, the gateway may be arranged to send a notification signal to a cloud server for further instructions. Any other protocols may be implemented without departing from the spirit or scope of the present disclosure. As a result, data signals from the erratic sensor may be considered noise or excluded when determining the real-time location of the UWB tag 14, thereby improving accuracy of UWB technology.

In accordance with another embodiment of the present disclosure, the system 10 further comprises the least square module 34 further arranged to calculate a predicted location of the UWB tag for at least four groups of at least three anchors based on the aligned data and the least square of error by way of:

$$X=(A^TA)^{-1}(A^TB),$$

to define a grouped predicted location for each anchor of the at least four groups. For example, system 10 comprises four anchors 20, 21, 22, 23 thereby defining four cluster groups: 20-21-22, 20-21-23, 20-22-23, and 21-22-23. The cluster groups may be categorized as groups A, B, C, and D, respectively.

Moreover, the least square module 34 is further arranged to determine an error matrix for anchors of the at least four groups based on the least square of error by way of:

$$\varepsilon = AX-B,$$

to define an error matrix for anchors of the at least four groups (here, A-D).

Additionally, the ECU 30 is further arranged to compare each local error of each anchor in the grouped error matrix with the error threshold defining a grouped threshold high of the at least four groups. The grouped threshold high is a highest count of local errors greater than the error threshold.

Further, the ECU 30 is arranged to compare the grouped threshold high with the first threshold high. The first threshold high is based on an error average of the local errors of the at least four anchors.

Furthermore, the ECU 30 determines the erratic sensor based on a higher count between the grouped threshold high and the first threshold high. Hence, the erratic sensor is identified to be the sensor with the highest count above the error threshold. In turn, a number of protocols may be triggered or put in place as desired. For example, the ECU may be arranged to power off the erratic sensor or ignore data signals therefrom. Additionally, the gateway may be arranged to send a notification signal to a cloud server for further instructions. Any other protocols may be implemented without departing from the spirit or scope of the present disclosure. As a result, data signals from the erratic sensor may be considered noise or excluded when determining the real-time location of the UWB tag 14, thereby improving accuracy of UWB technology.

Figures 2, 3:
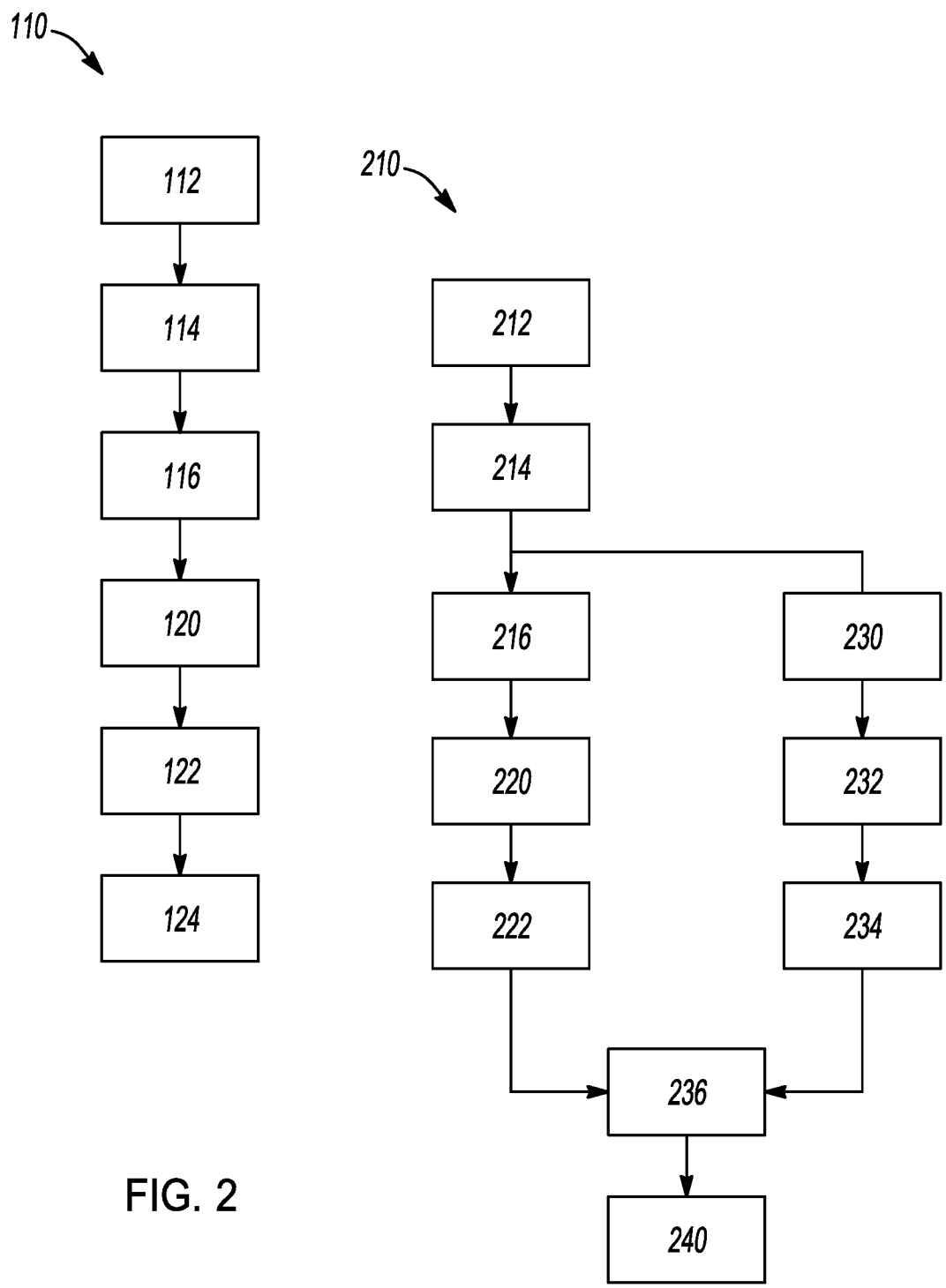
FIG. 2 is a flowchart of a method for diagnosing sensor performance of a UWB sensor localization for a vehicle in accordance with one example of the present disclosure.
FIG. 3 is a flowchart of a method for diagnosing sensor performance of a UWB sensor localization for a vehicle in accordance with another example of the present disclosure.

FIG. 2 depicts a flowchart for a method 110 of diagnosing sensor performance for a UWB sensor localization of a vehicle 12 in accordance with one embodiment of the present disclosure. In this example, the system 10 of FIG. 1 implements steps of the method 110 discussed in greater detail below. Moreover, it is to be understood that the ECU 30 of system 10 may comprise a number of modules (see above) arranged to run algorithms and formulas to calculate, compute, and determine values to assist in achieving the steps of the method 110.

As shown in block 112, the method 110 comprises receiving sensor signals from at least three UWB anchors and a UWB tag for a time period. As in the system 10, the sensor signals 20'-23' represent anchor coordinates and real-time distances between the tag and each anchor.

In block 114, the method 110 further comprises aligning the sensor signals 20'-23' at an aligned timestamp during the time period by way of:

$$\overline{t_{s_i} + \frac{k}{f_i}} = t_i \text{ when } t_{i-1} \le t_{s_i} + \frac{k}{f_i} < t_i.$$

As provided, $t_{si}$ is an initial timestamp of the time period, k is a number of timestamps of the time period, $f_i$ is a fixed data uploading frequency, $t_i$ is the aligned timestamp, and $t_{si}+klf_i$ is at an upper limit thereof to define aligned data.

In block 116, the method further comprises calculating a predicted location of the UWB tag based on the aligned data and a least square of error by way of:

$$X=(A^TA)^{-1}(A^TB)$$

where $$X = \begin{bmatrix} x \\ y \end{bmatrix}$$

is the predicted location, A is a first constructed matrix, and B is a second constructed matrix based on the anchor coordinates and the real-time distances.

To calculate the predicted location of the UWB tag, the method comprises via the least square module 34 calculating a geometric circle of each of the at least four UWB anchors relative to the aligned data by way of:

$$\begin{cases} (x-x_1)^2 + (y-y_1)^2 = d_1^2 \\ (x-x_2)^2 + (y-y_2)^2 = d_2^2 \\ \dots \\ (x-x_n)^2 + (y-y_n)^2 = d_n^2 \end{cases}$$

where x and y are the predicted coordinates of the UWB tag, n is the total number of signals from the UWB anchors during the time period, $x_n$ and $y_n$ are anchor coordinates of the respective UWB anchor, $d_n$ is a real-time distance between the UWB tag and the respective UWB anchor to define adjacent circles of the at least four UWB anchors.

In this example, calculating the predicted location of the UWB tag further comprises subtracting between adjacent circles by way of:

$$\begin{cases} 2(x_2-x_1)x + 2(y_2-y_1)y = d_1^2 - d_2^2 - (x_1^2+y_1^2) + (x_2^2+y_2^2) \\ 2(x_3-x_2)x + 2(y_3-y_2)y = d_2^2 - d_3^2 - (x_2^2+y_2^2) + (x_3^2+y_3^2) \\ \dots \\ 2(x_n-x_{n-1})x + 2(y_n-y_{n-1})y = d_{n-1}^2 - d_n^2 - \\ (x_{n-1}^2+y_{n-1}^2) + (x_n^2+y_n^2) \end{cases}$$

to define the first and second matrices as:

$$A = \begin{bmatrix} 2(x_2-x_1) & 2(y_2-y_1) \\ 2(x_3-x_2) & 2(y_3-y_2) \\ \dots & \dots \\ 2(x_n-x_{n-1}) & 2(x_n-x_{n-1}) \end{bmatrix} \text{ and}$$

$$B = \begin{bmatrix} d_1^2 - d_2^2 - (x_1^2+y_1^2) + (x_2^2+y_2^2) \\ d_2^2 - d_3^2 - (x_2^2+y_2^2) + (x_3^2+y_3^2) \\ \dots \\ d_{n-1}^2 - d_n^2 - (x_{n-1}^2+y_{n-1}^2) + (x_n^2+y_n^2) \end{bmatrix}.$$

In this example, calculating the predicted location of the UWB tag further comprises analyzing F(X)=E when a deviation of E to X is zero to minimize E by way of:

$$\frac{dF(X)}{dX} = 2A^T AX - 2A^T B = 0,$$

where E=|ε|²=(AX−B)$^T$(AX−B).

Moreover, in block 120, the method further comprises determining a local error of each of the at least four UWB anchors based on the least square of error by way of:

ε=AX−B where ε is the error matrix. In one example, to determine the local error in the error matrix of each of the at least four UWB anchors, the method comprises mapping each local error to each UWB anchor.

In block 122, the method further comprises comparing each local error with an error threshold to define a first threshold high. Preferably, the first threshold high is a highest count of local errors greater than the error threshold.

It is to be understood that the error threshold may be defined by way of any suitable offline data without departing from the spirit or scope of the present disclosure. For example, the error threshold may be defined by results from experimentation of normally functioning UWB anchors and malfunctioning UWB anchors whereby error deviations are found.

In block 124, the method further comprises determining an erratic anchor based on the first threshold high. Hence, the erratic sensor is identified to be the sensor with the highest count above the error threshold. In turn, a number of protocols may be triggered or put in place as desired. For example, the ECU 30 may be arranged to power off the erratic sensor or ignore data signals therefrom. Additionally, the gateway may be arranged to send a notification signal to a cloud server for further instructions. Any other protocols may be implemented without departing from the spirit or scope of the present disclosure. As a result, data signals from the erratic sensor may be considered noise or excluded when determining the real-time location of the UWB tag 14, thereby improving accuracy of UWB technology.

FIG. 3 depicts a flowchart for a method 210 of diagnosing sensor performance for a UWB sensor localization of a vehicle in accordance with another example of the present disclosure. In this example, the system 10 of FIG. 1 implements steps of the method 210 discussed in greater detail below. Moreover, it is to be understood that the ECU 30 of system 10 may comprise a number of modules (see above) arranged to run algorithms and formulas to calculate, compute, and determine values to assist in achieving the steps of the method 210.

As shown in block 212, the method 210 comprises receiving sensor signals from at least three UWB anchors and a UWB tag for a time period. As in the system 10, the sensor signals 20'-23' represent anchor coordinates and real-time distances between the tag and each anchor.

In block 214, the method 210 further comprises aligning the sensor signals 20'-23' at an aligned timestamp during the time period by way of:

$$\overline{t_{s_i} + \frac{k}{f_i}} = t_i \text{ when } t_{i-1} \le t_{s_i} + \frac{k}{f_i} < t_i.$$

As provided, $t_{s_i}$ is an initial timestamp of the time period, k is a number of timestamps of the time period, $f_i$ is a fixed data uploading frequency, $t_i$ is the aligned timestamp, and $t_{s_i}+k1f_i$ is at an upper limit thereof to define aligned data.

In block 216, the method 210 further comprises calculating a predicted location of the UWB tag based on the aligned data and a least square of error by way of:

X=(A$^T$A)$^{-1}$(A$^T$B)

where $$X = \begin{bmatrix} x \\ y \end{bmatrix}$$

is the predicted location, A is a first constructed matrix, and B is a second constructed matrix based on the anchor coordinates and the real-time distances.

To calculate the predicted location of the UWB tag, the method comprises via the least square module 34 calculating a geometric circle of each of the at least four UWB anchors relative to the aligned data by way of:

$$\begin{cases} (x-x_1)^2 + (y-y_1)^2 = d_1^2 \\ (x-x_2)^2 + (y-y_2)^2 = d_2^2 \\ \cdots \\ (x-x_n)^2 + (y-y_n)^2 = d_n^2 \end{cases}$$

where x and y are the predicted coordinates of the UWB tag, n is the total number of signals from the UWB anchors during the time period, $x_n$ and $y_n$ are anchor coordinates of the respective UWB anchor, $d_n$ is a real-time distance between the UWB tag and the respective UWB anchor to define adjacent circles of the at least four UWB anchors.

In this example, calculating the predicted location of the UWB tag further comprises subtracting between adjacent circles by way of:

$$\begin{cases} 2(x_2-x_1)x + 2(y_2-y_1)y = d_1^2 - d_2^2 - (x_1^2+y_1^2) + (x_2^2+y_2^2) \\ 2(x_3-x_2)x + 2(y_3-y_2)y = d_2^2 - d_3^2 - (x_2^2+y_2^2) + (x_3^2+y_3^2) \\ \cdots \\ 2(x_n-x_{n-1})x + 2(y_n-y_{n-1})y = d_{n-1}^2 - d_n^2 - (x_{n-1}^2+y_{n-1}^2) + (x_n^2+y_n^2) \end{cases}$$

to define the first and second matrices as:

$$A = \begin{bmatrix} 2(x_2-x_1) & 2(y_2-y_1) \\ 2(x_3-x_2) & 2(y_3-y_2) \\ \cdots & \cdots \\ 2(x_n-x_{n-1}) & 2(x_n-x_{n-1}) \end{bmatrix} \text{ and }$$

$$B = \begin{bmatrix} d_1^2 - d_2^2 - (x_1^2+y_1^2) + (x_2^2+y_2^2) \\ d_2^2 - d_3^2 - (x_2^2+y_2^2) + (x_3^2+y_3^2) \\ \cdots \\ d_{n-1}^2 - d_n^2 - (x_{n-1}^2+y_{n-1}^2) + (x_n^2+y_n^2) \end{bmatrix}.$$

In this example, calculating the predicted location of the UWB tag further comprises analyzing F(X)=E when a deviation of E to X is zero to minimize E by way of:

$$\frac{dF(X)}{dX} = 2A^T AX - 2A^T B = 0,$$

where E=|ε|²=(AX−B)$^T$(AX−B).

Moreover, in block 220, the method 210 further comprises determining a local error of each of the at least four UWB anchors based on the least square of error by way of:

$$\varepsilon = AX - B$$

where ε is the error matrix. In one example, to determine the local error in the error matrix of each of the at least four UWB anchors, the method 210 comprises mapping each local error to each UWB anchor.

In block 222, the method 210 further comprises comparing each local error with an error threshold to define a first threshold high. Preferably, the first threshold high is based on an error average of the local errors of the at least four anchors.

Furthermore, it is to be understood that the error threshold may be defined by way of any suitable offline data without departing from the spirit or scope of the present disclosure. For example, the error threshold may be defined by results from experimentation of normally functioning UWB anchors and malfunctioning UWB anchors whereby error deviations are found.

In this example, in block 230, the method 210 further comprises calculating a predicted location of the UWB tag for at least four groups of at least three anchors based on the aligned data and the least square of error by way of:

$$X = (A^T A)^{-1} (A^T B),$$

to define a grouped predicted location for each anchor of the at least four groups.

In block 232, the method 210 further comprises determining an error matrix for anchors of the at least four groups based on the least square of error by way of:

$$\varepsilon = AX - B,$$

to define an error matrix for anchors of the at least four groups.

In block 234, the method 210 via the ECU 30 further comprises comparing each local error of each anchor in the grouped error matrix with the error threshold defining a grouped threshold high of the at least four groups. Preferably, the grouped threshold high is a highest count of local errors greater than the error threshold. Moreover, in block 236, the method 210 comprises comparing the grouped threshold high with the first threshold high.

Furthermore, in block 240, the method 210 comprises determining an erratic sensor is based on a higher count between the grouped threshold high and the first threshold high. Hence, the erratic sensor is identified to be the sensor with the highest count above the error threshold. In turn, a number of protocols may be triggered or put in place as desired. For example, the ECU may be arranged to power off the erratic sensor or ignore data signals therefrom. Additionally, the gateway may be arranged to send a notification signal to a cloud server for further instructions. Any other protocols may be implemented without departing from the spirit or scope of the present disclosure. As a result, data signals from the erratic sensor may be considered noise or excluded when determining the real-time location of the UWB tag 14, thereby improving accuracy of UWB technology.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of diagnosing sensor performance of an ultra wide band (UWB) sensor localization for a vehicle, the method comprising:
   receiving sensor signals from at least four UWB anchors and a UWB tag for a time period, the sensor signals representing anchor coordinates and real-time distances between the tag and each anchor;
   aligning the sensor signals at an aligned timestamp during the time period by way of:

$$\overline{t_{si} + k/f_i} = t_i \text{ when } t_{i-1} \leq t_{si} + k/f_i < t_i$$

where $t_{si}$ is an initial timestamp of the time period, k is a number of timestamps of the time period, $f_i$ is a fixed data uploading frequency, $t_i$ is the aligned timestamp, $t_{si} + k/f_i$ is at an upper limit thereof to define aligned data;
   calculating a predicted location of the UWB tag based on the aligned data and a least square of error by way of:

$$X = (A^T A)^{-1} (A^T B)$$

where $$X = \begin{bmatrix} x \\ y \end{bmatrix}$$

is the predicted location, A is a first constructed matrix, and B is a second constructed matrix based on the anchor coordinates and the real-time distances;
   determining an error matrix of the at least four UWB anchors based on the least square of error by way of:

$$\varepsilon = AX - B$$

where ε is the error matrix;
   comparing each local error with an error threshold to define a first threshold high;
   determining an erratic anchor based on the first threshold high;
   triggering a protocol, the protocol including at least one of powering off the UWB sensor, ignoring data signals from the UWB sensor, and sending a notification signal to a cloud server,
   wherein calculating the predicted location of the UWB tag comprises calculating a geometric circle of each of the at least four UWB anchors relative to the aligned data by way of:

$$\begin{cases} (x - x_1)^2 + (y - y_1)^2 = d_1^2 \\ (x - x_2)^2 + (y - y_2)^2 = d_2^2 \\ \dots \\ (x - x_n)^2 + (y - y_n)^2 = d_n^2 \end{cases}$$

where x and y are predicted coordinates of the UWB tag, n is the total number of signals from the UWB anchors during the time period, $x_n$ and $y_n$ are anchor coordinates of the respective UWB anchor, $d_n$ is a real-time distance between the UWB tag and the respective UWB anchor to define adjacent circles of the at least four UWB anchors.

2. The method of claim 1 wherein calculating the predicted location of the UWB tag comprises subtracting between adjacent circles by way of:

$$\begin{cases} 2(x_2-x_1)x+2(y_2-y_1)y = d_1^2-d_2^2-(x_1^2+y_1^2)+(x_2^2+y_2^2) \\ 2(x_3-x_4)x+2(y_3-y_2)y = d_2^2-d_3^2-(x_2^2+y_2^2)+(x_3^2+y_3^2) \\ \quad \cdots \\ 2(x_n-x_{n-1})x+2(y_n-y_{n-1}) = d_{n-1}^2-d_n^2-(x_{n-1}^2+y_{n-1}^2)+(x_n^2+y_n^2) \end{cases}$$

to define the first and second matrices as:

$$A = \begin{bmatrix} 2(x_2-x_1) & 2(y_2-y_1) \\ 2(x_3-x_2) & 2(y_3-y_2) \\ \cdots & \cdots \\ 2(x_n-x_{n-1}) & 2(x_n-x_{n-1}) \end{bmatrix} \text{ and}$$

$$B = \begin{bmatrix} d_1^2-d_2^2-(x_1^2+y_1^2)+(x_2^2+y_2^2) \\ d_2^2-d_3^2-(x_2^2+y_2^2)+(x_3^2+y_3^2) \\ \cdots \\ d_{n-1}^2-d_n^2-(x_{n-1}^2+y_{n-1}^2)+(x_n^2+y_n^2) \end{bmatrix}.$$

3. The method of claim 2 wherein calculating the predicted location of the UWB tag comprises analyzing F(X)=E when a deviation of E to X is zero to minimize E by way of:

$$\frac{dF(X)}{dX} = 2A^TAX - 2A^TB = 0,$$

where $E=|\varepsilon|^2=(AX-B)^T(AX-B)$.

4. The method of claim 1 wherein determining the local error of each of the at least four UWB anchors comprises mapping each local error to each UWB anchor.

5. The method of claim 1 wherein the first threshold high is a highest count of local errors greater than the error threshold.

6. The method of claim 1 further comprising:
calculating a predicted location of the UWB tag for at least four groups of at least three anchors based on the aligned data and the least square of error by way of:

$X=(A^TA)^{-1}(A^TB).$ to define a grouped predicted location for each anchor of the at least four groups;
determining an error matrix for anchors of the at least four groups based on the least square of error by way of:

$\varepsilon=AX-B,$ to define an error matrix for anchors of the at least four groups;
comparing each local error of each anchor in the grouped error matrix with the error threshold defining a grouped threshold high of the at least four groups, the grouped threshold high being a highest count of local errors greater than the error threshold; and
comparing the grouped threshold high with the first threshold high, the first threshold high being based on an error average of the local errors of the at least four anchors.

7. The method of claim 6 wherein determining the erratic sensor is based on a higher count between the grouped threshold high and the first threshold high.

8. A system for diagnosing sensor performance of an ultra wide band (UWB) sensor localization for a vehicle, the system comprising:
a UWB tag arranged to be mobile and trackable by way of a sensor signal;
at least four UWB anchors, each UWB anchor being in communication with the UWB tag and arranged to receive and send the sensor signal for tracking the UWB tag; and
a gateway in communication with the UWB anchor, the gateway comprising an electronic control unit (ECU) arranged to receive sensor signals from at the UWB anchors for a time period, the sensor signals representing anchor coordinates and real-time distances between the tag and each anchor, the ECU comprising:
a preprocessing module arranged to align the sensor signals at an aligned timestamp during the time period by way of:

$$\overline{t_{s_i}+\frac{k}{f_i}} = t_i \text{ when } t_{i-1} \le t_{s_i}+\frac{k}{f_i} < t_i$$

where $t_{si}$ is an initial timestamp of the time period, k is a number of timestamps of the time period, $f_i$ is a fixed data uploading frequency, $t_i$ is the aligned timestamp, $t_{si}+k/f_i$ is at an upper limit thereof to define aligned data; and
a least square module arranged to calculate a predicted location of the UWB tag based on the aligned data and a least square of error by way of:

$X=(A^TA)^{-1}(A^TB)$ where $$X = \begin{bmatrix} x \\ y \end{bmatrix}$$

is the predicted location, A is a first constructed matrix, and B is a second constructed matrix based on the anchor coordinates and the real-time distances, the least square module further arranged to determine an error matrix of the at least four UWB anchors based on the least square of error by way of:

$\varepsilon=AX-B$ where $\varepsilon$ is the error matrix,
wherein the ECU is arranged to compare each local error in the error matrix with an error threshold to define a first threshold high and determine an erratic anchor based on the first threshold high,
and wherein the ECU is configured to trigger a protocol, the protocol including at least one of powering off the UWB sensor, ignoring data signals from the UWB sensor, and sending a notification signal to a cloud server, and
wherein calculating the predicted location of the UWB tag comprises calculating a geometric circle of each of the at least four UWB anchors relative to the aligned data by way of:

$$\begin{cases} (x-x_1)^2+(y-y_1)^2 = d_1^2 \\ (x-x_2)^2+(y-y_2)^2 = d_2^2 \\ \cdots \\ (x-x_n)^2+(y-y_n)^2 = d_n^2 \end{cases}$$

where x and y are predicted coordinates of the UWB tag, n is the total number of signals from the UWB anchors during the time period, $x_n$ and $y_n$ are anchor coordinates of the respective UWB anchor, $d_n$ is a real-time distance between the UWB tag and the respective UWB anchor to define adjacent circles of the at least four UWB anchors.

9. The system of claim 8 wherein the least square module is arranged to calculate the predicted location of the UWB tag comprises:
the least square module being arranged to subtract between the adjacent circles by way of:

$$\begin{cases} 2(x_2 - x_1)x + 2(y_2 - y_1)y = d_1^2 - d_2^2 - (x_1^2 + y_1^2) + (x_2^2 + y_2^2) \\ 2(x_3 - x_4)x + 2(y_3 - y_2)y = d_2^2 - d_3^2 - (x_2^2 + y_2^2) + (x_3^2 + y_3^2) \\ \cdots \\ 2(x_n - x_{n-1})x + 2(y_n - y_{n-1}) = d_{n-1}^2 - d_n^2 - (x_{n-1}^2 + y_{n-1}^2) + (x_n^2 + y_n^2) \end{cases}$$

to define the first and second matrices as:

$$A = \begin{bmatrix} 2(x_2 - x_1) & 2(y_2 - y_1) \\ 2(x_3 - x_2) & 2(y_3 - y_2) \\ \cdots & \cdots \\ 2(x_n - x_{n-1}) & 2(x_n - x_{n-1}) \end{bmatrix} \text{ and}$$

$$B = \begin{bmatrix} d_1^2 - d_2^2 - (x_1^2 + y_1^2) + (x_2^2 + y_2^2) \\ d_2^2 - d_3^2 - (x_2^2 + y_2^2) + (x_3^2 + y_3^2) \\ \cdots \\ d_{n-1}^2 - d_n^2 - (x_{n-1}^2 + y_{n-1}^2) + (x_n^2 + y_n^2) \end{bmatrix}.$$

10. The system of claim 9 wherein the least square module is arranged to calculate the predicted location of the UWB tag comprises:
the least squares module being arranged to analyze F(X)=E when a deviation of E to X is zero to minimize E by way of:

$$dF(X)/dX = 2A^T AX - 2A^T B = 0,$$

$$E = |\varepsilon|^2 = (AX - B)^T (AX - B).$$

11. The system of claim 8 wherein the ECU is arranged to determine the local error of each of the at least four UWB anchors comprises the ECU being arranged to map each local error to each UWB anchor.

12. The system of claim 8 wherein the first threshold high is a highest count of local errors greater than the error threshold.

13. The system of claim 8 wherein the least square module is further arranged to calculate a predicted location of the UWB tag for at least four groups of at least three anchors based on the aligned data and the least square of error by way of:

$$X = (A^T A)^{-1}(A^T B).$$

to define a grouped predicted location for each anchor of the at least four groups, the least square module arranged to determine an error matrix for anchors of the at least four groups based on the least square of error by way of:

$$\varepsilon = AX - B,$$

to define an error matrix for anchors of the at least four groups, and
wherein the ECU is further arranged to compare each local error of each anchor in the grouped error matrix with the error threshold defining a grouped threshold high of the at least four groups, the grouped threshold high being a highest count of local errors greater than the error threshold, the ECU arranged to compare the grouped threshold high with the first threshold high, the first threshold high being based on an error average of the local errors of the at least four anchors.

14. The system of claim 13 wherein determining the erratic sensor is based on a higher count between the grouped threshold high and the first threshold high.

15. A method of diagnosing sensor performance of an ultra wide band (UWB) sensor localization for a vehicle, the method comprising:
receiving sensor signals from at least four UWB anchors and a UWB tag for a time period, the sensor signals representing anchor coordinates and real-time distances between the tag and each anchor;
aligning the sensor signals at an aligned timestamp during the time period to define aligned data;
calculating a predicted location of the UWB tag based on the aligned data and a least square of error to define a first constructed matrix and a second constructed matrix based on the anchor coordinates and the real-time distances;
determining a local error of each of the at least four UWB anchors based on the least square of error;
comparing each local error with an error threshold to define a first threshold high;
determining an erratic anchor based on the first threshold high; and
triggering a protocol, the protocol including at least one of powering off the UWB sensor, ignoring data signals from the UWB sensor, and sending a notification signal to a cloud server,
wherein calculating the predicted location of the UWB tag comprises calculating a geometric circle of each of the at least four UWB anchors relative to the aligned data by way of:

$$\begin{cases} (x - x_1)^2 + (y - y_1)^2 = d_1^2 \\ (x - x_2)^2 + (y - y_2)^2 = d_2^2 \\ \cdots \\ (x - x_n)^2 + (y - y_n)^2 = d_n^2 \end{cases}$$

where x and y are predicted coordinates of the UWB tag, n is the total number of signals from the UWB anchors during the time period, $x_n$ and $y_n$ are anchor coordinates of the respective UWB anchor, $d_n$ is a real-time distance between the UWB tag and the respective UWB anchor to define adjacent circles of the at least four UWB anchors.

16. The method of claim 15 wherein determining the local error of each of the at least four UWB anchors comprises mapping each local error to each UWB anchor.

17. The method of claim 15 further comprising:
calculating a predicted location of the UWB tag for at least four groups of at least three anchors based on the aligned data and the least square of error to define a grouped predicted location for each anchor of the at least four groups;
determining a local error for each anchor of the at least four groups based on the least square of error to define a grouped local error for each anchor of the at least four groups;
comparing each grouped local error of each anchor with the error threshold defining a grouped threshold high of the at least four groups, the grouped threshold high being a highest count of local errors greater than the error threshold; and comparing the grouped threshold high with the first threshold high, the first threshold high being based on an error average of the local errors of the at least four anchors.

18. The method of claim 17 wherein determining the erratic sensor is based on a higher count between the grouped threshold high and the first threshold high.

* * * * *